US007387241B2

(12) United States Patent
Hassenbuerger

(10) Patent No.: US 7,387,241 B2
(45) Date of Patent: Jun. 17, 2008

(54) SELF-SERVICE CHECKOUT

(75) Inventor: Anneliese Hassenbuerger, Paderborn (DE)

(73) Assignee: Wincor Nixdorf International GmbH (DE)

( * ) Notice: Subject to any disclaimer, the term of this patent is extended or adjusted under 35 U.S.C. 154(b) by 235 days.

(21) Appl. No.: 10/557,983

(22) PCT Filed: Apr. 15, 2004

(86) PCT No.: PCT/DE2004/000789

§ 371 (c)(1),
(2), (4) Date: Nov. 21, 2005

(87) PCT Pub. No.: WO2004/109611

PCT Pub. Date: Dec. 16, 2004

(65) Prior Publication Data

US 2006/0266824 A1 Nov. 30, 2006

(30) Foreign Application Priority Data

May 22, 2003 (DE) ................................ 103 23 691

(51) Int. Cl.
*G06K 15/00* (2006.01)

(52) U.S. Cl. .................. 235/383; 235/381; 235/462.01

(58) Field of Classification Search ................ 235/383, 235/381, 462.01; 186/59, 61; 705/23
See application file for complete search history.

(56) References Cited

U.S. PATENT DOCUMENTS 5,365,048 A * 11/1994 Komiya et al. ........ 235/462.08
6,215,078 B1 * 4/2001 Torres et al. ............ 177/25.15
6,427,914 B1 8/2002 Snyder
6,497,362 B2 * 12/2002 Persky et al. ............... 235/383
6,598,791 B2 * 7/2003 Bellis et al. ................ 235/383
6,641,042 B1 * 11/2003 Pierenkemper et al. 235/462.01
6,672,512 B2 * 1/2004 Bridgelall .............. 235/462.46
6,726,094 B1 * 4/2004 Rantze et al. ............... 235/379
7,118,026 B2 * 10/2006 Harris et al. ................ 235/375
7,150,395 B1 * 12/2006 White ........................ 235/383
7,248,754 B2 * 7/2007 Cato .......................... 382/318
2002/0096564 A1 7/2002 Behrens et al.

FOREIGN PATENT DOCUMENTS

EP 0 338 376 A2 10/1989
EP 1 248 244 A 10/2002
EP 1 255 217 A 11/2002
EP 103 23 691 A1 12/2004
WO WO-2004/109611 A1 12/2004

OTHER PUBLICATIONS

International Search Report for PCT/DE2004/000789, dated Jul. 28, 2004; ISA/EP.

* cited by examiner

*Primary Examiner*—Ahshik Kim
(74) *Attorney, Agent, or Firm*—Harness, Dickey & Pierce, P.L.C.

(57) ABSTRACT

The invention relates to the reliable and rapid registration of articles, which are provided with a barcode and/or an RFID tag, at a self-service checkout. This is made possible by installing a barcode reader and an RFID reader in the region of the product registration area. In order to avoid double registration in the case of articles having both a barcode identifier and an RFID tag (transponder), the barcode reader and the RFID tag are connected to a data processing device, with the result that, if an article is registered twice, only the single price is calculated.

7 Claims, 3 Drawing Sheets

SELF-SERVICE CHECKOUT

BACKGROUND OF THE INVENTION

The invention relates to a self-service checkout for acquiring data from merchandise.

Products in the commercial environment are usually marked with barcodes which are normally applied to the packaging or the product itself by the manufacturer. In order to read a barcode, use is made of barcode readers, which are available in different forms for the various areas of use. The most common readers contain a laser and various mirrors in order to scan the barcode pattern. There are barcode readers which are permanently installed and portable barcode readers.

However, in addition to barcode technology, RFID ("radio frequency identification") systems are also increasingly being used as identification marks and are utilized to identify products.

An RFID system essentially comprises two components: the mobile data storage media, which are also referred to as an encoder, transponder, RFID tag, ID transmitter or ID card and are carried by a user or are fitted to an object to be identified such as a commercial product, and the reader, which is also referred to as a base station or transceiver and reads the data from the transponders or writes new data to the latter. In addition, the reader can also provide power for the transponder. An antenna which, in simple cases, is in the form of an air-core coil is needed at both ends to transmit the data. Depending on their design, the transponders store information which ranges from a simple identification number to complex user or measured data. In the case of transponders, a distinction is made between active and passive identification. Passive identification is distinguished by the fact that the transponder can be continuously checked by the reader without the assistance of the user or the product. They obtain their power from the reader's magnetic field. As a result, they are very robust and require no maintenance. If the encoder is within a certain range of the transmission and reception unit, identification is effected automatically. The range is generally restricted by the radio field attenuation. By contrast, in the case of an active identification system, communication is actively initiated by the user from the transponder. In this case, a user must operate the transponder manually. Active transponders have their own power source, usually in the form of a primary source. The limited life is disadvantageous here.

Various radio-based transmission technologies are possible or customary: LF systems in the frequency range of 100-300 kHz, RF systems at 433 MHz or 867 MHz and radio-frequency microwave systems, which usually operate at the frequencies of 2.4 GHz, 5.8 GHz, 9.5 GHz or 24 GHz. Transponders in the kHz frequency range have ranges of a few centimeters. They are referred to as proximity tags, since they operate in direct proximity. Transponders which operate in the MHz frequency range are called vicinity tags, since, with ranges of up to approximately 2 m, they are used in the vicinity of the registration devices. Active transponders having a range of up to several meters essentially operate at the frequency of 2.4 GHz.

These RFID systems are also increasingly being used in supermarkets, with the proximity transponders, in particular, being used in this case. In the commercial environment, in addition to identifying the commercial product, RFID tags of this type have the advantage of a considerable improvement in product tracking, thus making the logistical processes easier for the manufacturer to comprehend than is the case with a barcode. In particular, the transponders are resistant to environmental influences, for example high and low temperatures, moisture, vibration, impact, dust, oil and dirt. Depending on the design of the finished product, the transponder may be fitted discreetly or invisibly, for example in the packaging.

In the commercial environment, particularly in supermarkets, self-service checkouts are increasingly being used to lower the personnel costs. Various self-service checkouts are known, in the case of which the products selected by the customer are registered and an automatic bill is produced. The customer takes the products, which have normally been deposited in a shopping cart, to the self-service checkout and subjects them to a scanning operation in which the barcode on the products is normally scanned by a barcode reader. The products are then placed in a packing area which may also be a further shopping cart or a shopping bag and which is coupled to scales. When the products are being identified by scanning the barcode, the product price, the type of product and the weight are determined. When the customer then places the products in the packing area, they are weighed again and the weighing result is compared with the weight intended for this type of product or with the weight which was determined when recording the weight of products which had to be weighed individually. If the comparison variables match, incorrect evaluation or an attempt to deceive can be ruled out.

EP 338 376 A2 describes a method for optically scanning markings, such as barcodes, on articles at a self-service checkout.

If, however, products are now offered which in some cases are provided with a barcode identification mark and in other cases are provided with an RFID identification mark, the cashier (in the case of an attended cash register) identifies whether the product is provided with an RFID tag or with a barcode and can then use a barcode reader or an RFID reader according to the marking which has been applied. By contrast, in the self-service environment, it has hitherto not been possible to use the customary self-service checkouts to register these products which are identified using an RFID transponder.

SUMMARY OF THE INVENTION

Therefore, it is an object of the invention to make it possible to register articles having a barcode and/or an RFID tag in a reliable and rapid manner at a self-service checkout.

This object is achieved by means of the features specified in claim 1. The installation of a barcode reader and of an RFID reader in the region of a product registration area of a self-service checkout makes it possible both to register articles which are provided with an RFID tag (transponder) and/or to register articles which are provided with a barcode. In order to avoid double registration in the case of articles having both a barcode identifier and an RFID tag (transponder), the barcode reader and the RFID tag are connected to a data processing device, with the result that, if an article is registered twice, only the single price is calculated.

Furthermore, the product registration area is advantageously provided with a camera. The images recorded by the camera are forwarded to the data processing device, and image processing is used to determine how many products have passed through the product registration area. Double registration in the case of products having both a barcode and an RFID tag can be ruled out by means of comparison with the image recorded.

In order to prevent theft, the RFID reader is furthermore advantageously in the form of a transmission device such that writeable transponders can be rendered invalid by transmitting an appropriate code. These transponders are preferably used for expensive goods. When the customer then leaves the store, further RFID readers may be installed in the region of the exit, said further readers receiving the signals from transponders that have not been rendered invalid and thus being able to indicate the theft of the article, for example by triggering an alarm.

DESCRIPTION OF THE DRAWINGS

Further details and advantages of the invention can be found in the description below and in the drawing, in which.

DETAILED DESCRIPTION OF THE INVENTION

Figure 1:
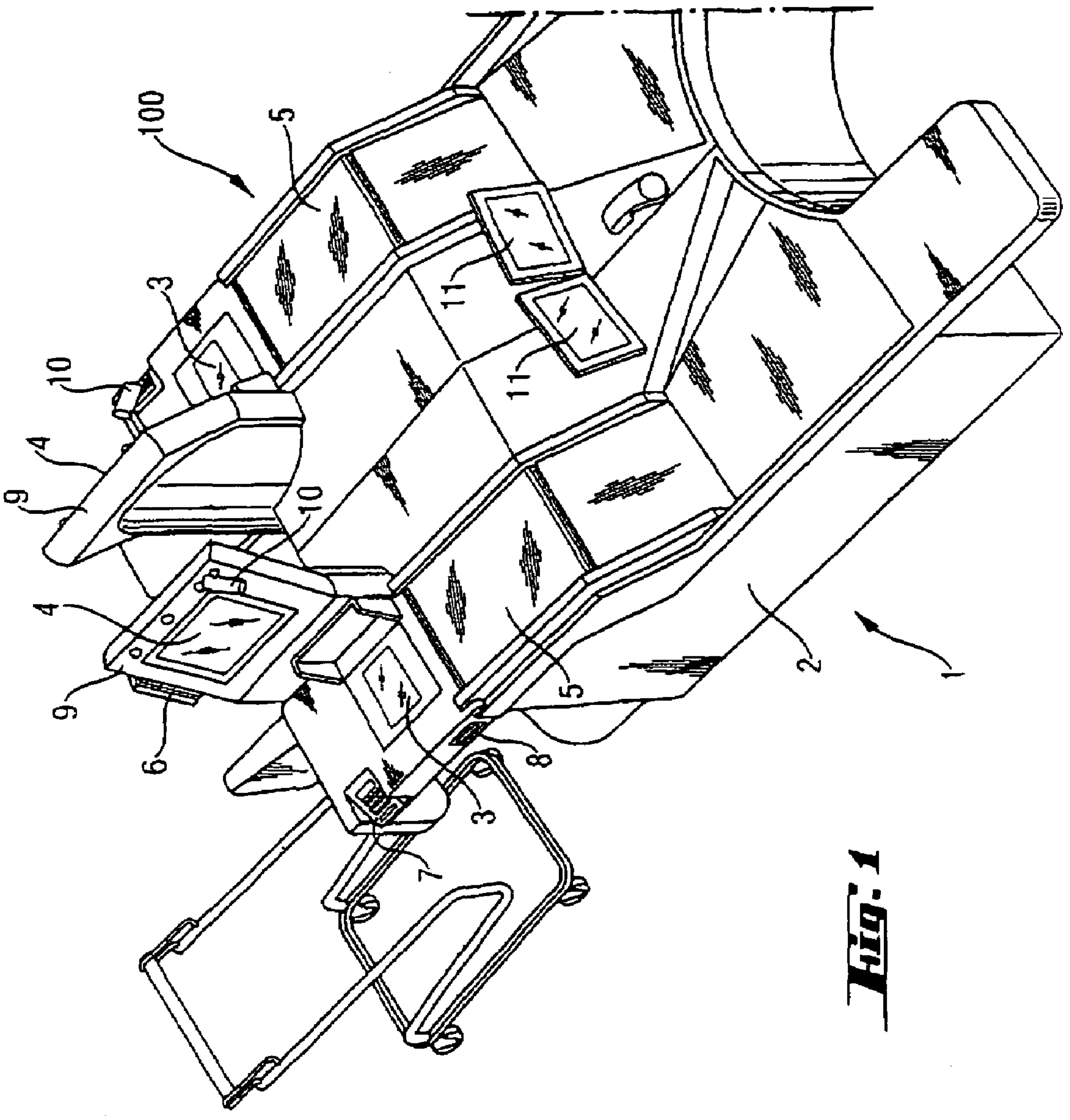
FIG. 1: shows a perspective view of an exemplary embodiment of a self-service checkout according to the invention.

FIG. 1 shows an exemplary embodiment of a self-service checkout 1 which comprises a support housing 2. The support housing 2 has a product registration area 3 which is provided with a barcode reader (not shown in any more detail here) and an RFID reader. Furthermore, scales for registering items such as fruit and vegetables may also be advantageously integrated in the product registration area 3.

Figure 2:
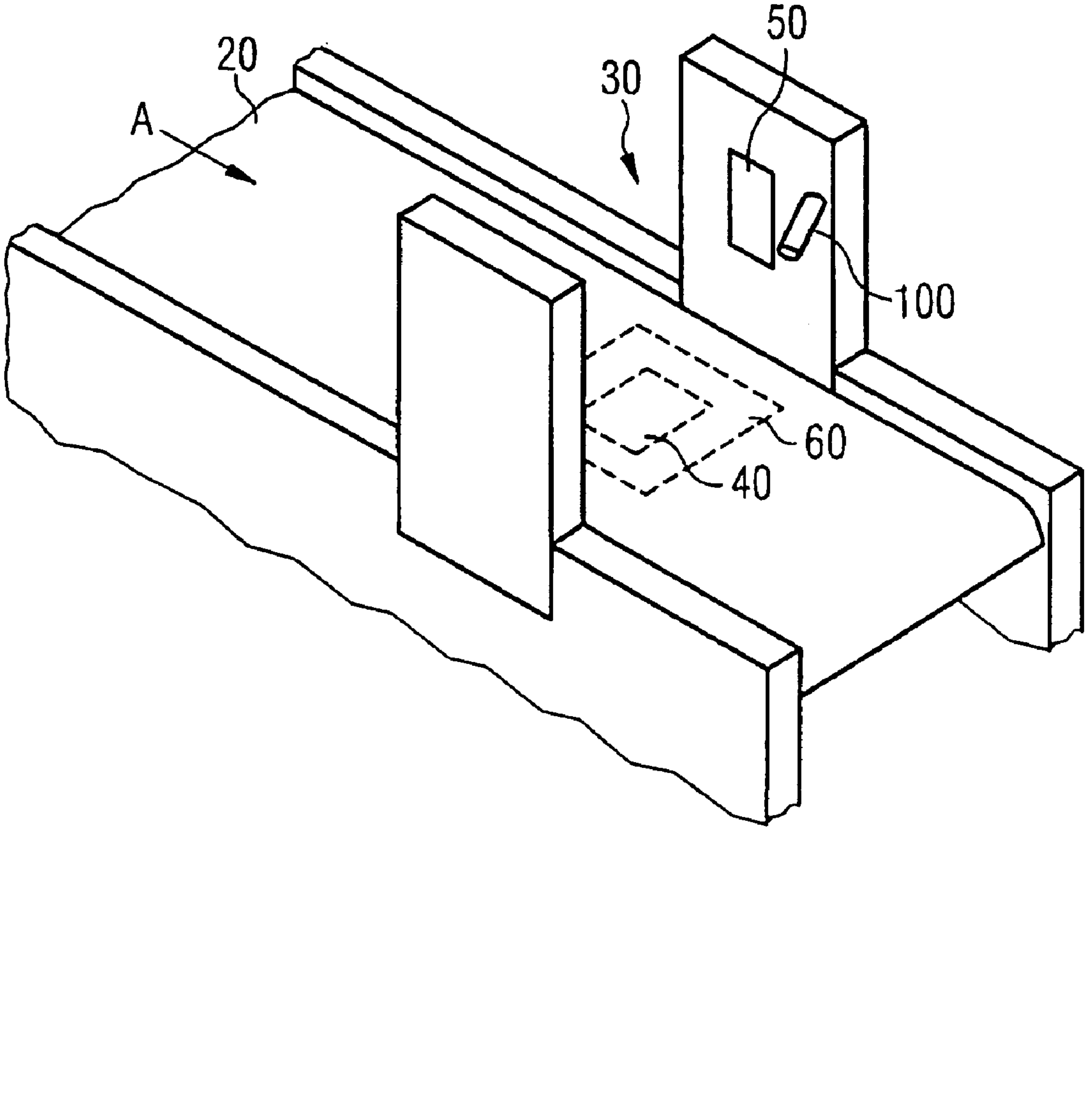
FIG. 2: shows a schematic perspective illustration of a modified form of the invention having a transport device.

In addition to a product registration area 3, at which the customers manually scan the products, a transport device 20 such as a conveyor belt is provided in a further embodiment (shown in FIG. 2) of the invention, the customers placing the products onto said conveyor belt and the latter transporting the products into the scanning region of a product registration area 30. In this case, it is conceivable for the RFID reader 40 to be fitted underneath the conveyor belt 20 in order to make optimum use of the space. One or more barcode readers 50 are preferably fitted to the side of, or above, the transport device in order to make it possible to register the barcode in all three dimensions. Scales 60 for registering items such as fruit and vegetables may furthermore be integrated underneath the conveyor belt 20.

The RFID reader emits transmitted signals, modulated over a broad bandwidth, as required or continuously and then waits for the reception of reflected signals (echo signals), that is to say that the RFID reader is in the form of a transmitter and a receiver. If a product having a transponder comes near the RFID reader, the reader's magnetic field activates the RFID data storage medium (transponder) by virtue of the power needed to operate the transponder being transmitted via a coupling element. The transponder behaves in a passive manner outside the reader's response range which it generally does not have its own power supply. In the commercial environment, in particular, use will be made of transponders which have only a very short range so that it is not possible to register undesired articles. After the transponder has been activated, communication is set up between the transponder and the reader so that the data stored in the transponder can be transmitted to the reader. Transponders used in the commercial environment are generally permanently programmed data storage media which reproduce only the data which were written in when the transponder was manufactured. However, in the case of expensive goods, in particular, use may be made of transponders which can be written to by the reader, with the result that, for example, the transponder can be rendered invalid by the reader. In this case, a further RFID reader which can receive the signals from transponders which have not been rendered invalid may be installed in the region of the supermarket exit. The theft of the article can then be indicated, for example, by triggering an alarm. In addition, it may also be necessary, for reasons of data protection, to render special transponders invalid.

A display 4 for displaying customer information such as the price, the weight, the type of product etc. is furthermore provided, the display 4 preferably being situated in the vicinity of the product registration area 3. If, however, a self-service checkout is involved in which the products are transported to the product registration area 30 using a transport device 20 such as a conveyor belt, the display 4 may also be situated at another location. The display 4 may be in the form of a liquid crystal display screen and may be provided with a touchscreen function. Provided beside the product registration area 3 is a product packing area which comprises a weighing device 5 so that it is possible to record the weight of the products which have been packed. Furthermore, a swipe card reader 6 and a card insertion reader 8 for credit cards and EC cards and a PIN input keypad 7 for payment operations are advantageously provided. In addition, the product registration area 3 can also be recorded visually using a video camera 10, which is preferably fastened to the display housing 9. In the embodiment shown in FIG. 2, a camera 100 is fitted to the product registration area 30 to the side of the conveyor belt 20. However, it may also be positioned above the transport device 20.

It is furthermore possible, within the scope of the invention, to provide the self-service checkout with a cash module for paying with banknotes and coins.

After selecting the products, the customer generally takes the products which have been collected in a shopping cart to the self-service checkout 1, takes the products out of the cart and scans them using the product registration area 3 or places the products on the transport device 20, which supplies them to the product registration area 30. The barcode which has been applied to the products or an RFID identification mark is registered at the product registration area 3, 30. After product registration, the customer places the products on the weighing device 5, on which the weight of all of the products which have already been registered is added up. This weighing device 5 is used to prevent theft. If the weight of the articles which have been placed on the weighing device 5 does not match the weight of the articles which have been registered, an appropriate message is output on the display 4 or is output audibly, said message informing the customer to reregister the article which has just been packed.

Figure 3:
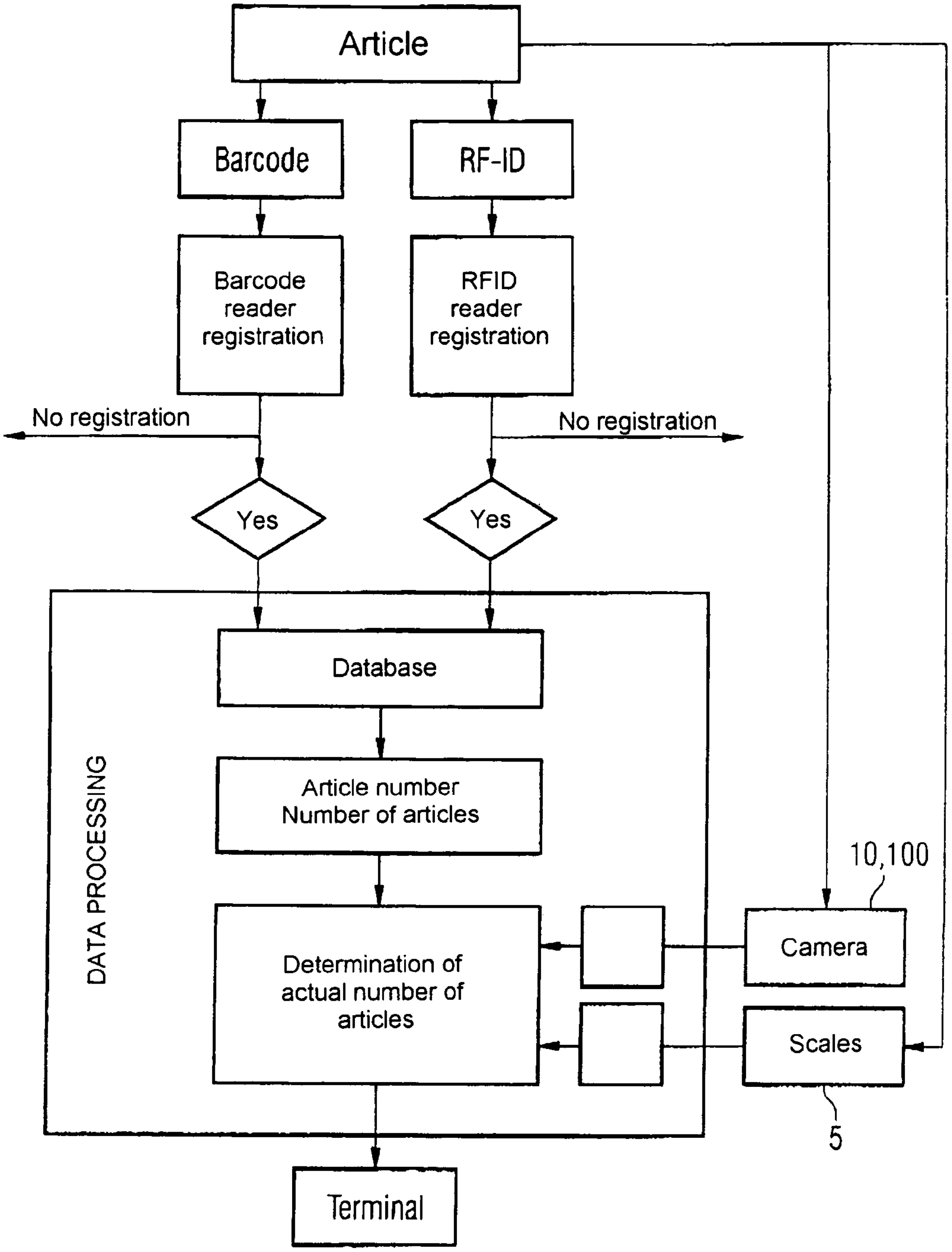
FIG. 3: shows a block diagram of product registration.

As illustrated in FIG. 3, the information received by the barcode reader or the RFID reader is forwarded to a data processing device in the self-service checkout and is processed further there. In particular, a price provided in a database is assigned to an article which has been scanned in. If an article is provided with both a barcode and an RFID encoder, both items of information may be registered simultaneously. Since the information is forwarded to the data processing device, allowance is made for double registration and only the single price is calculated. Since each product is also identified by its weight, the data processing device may, in addition, also be connected to the weighing device 5. In the event of double registration, comparison with the weight G determined on the weighing device 5 then makes it possible to determine whether there is actually only one article. In addition, the camera 10, 100 can also be linked to the data processing. Processing B the image recorded by the camera 10, 100 determines the number of products situated in the region of the product registration area 3, 30. In the event of double registration in the case of an RFID tag and a barcode, comparison with the visual result makes it possible to determine and thus calculate the true number of products. In addition, camera monitoring can be used if barcode registration and/or RFID scanning has/have not been effected. Since the camera 10, 100 has recorded an excess number of products in this case, the customer's attention is drawn, audibly or visually, to the fact that individual articles need to be reregistered.

If the customer has scanned in all of the products and the weight of the products which have been placed on the weighing device 5 still matches the weight that results from product registration, the customer pushes a button at the end of the operation, in order to signal that all of the products have now been registered, and thus initiates the payment operation. The total price is displayed on the display 4 and the customer can now use a credit card or his EC card or cash to pay the bill.

In addition, it is possible for a second video camera (not shown here) to record the weighing device 5 in order to make it possible to reregister articles which were inadvertently not scanned. The camera is activated when the weight indicated by the weighing device 5 changes without an article having been scanned or registered by means of an RFID tag. The camera thus records the last article placed onto the weighing device 5. This image from the camera can be conveyed to an operator on the display 11, said operator thus being informed about the article which has not been registered and accordingly being able to request the customer to reregister the article which has inadvertently not been registered. It is furthermore possible for this image recording to also be linked to the data processing of the barcode reader and the RFID reader in order to avoid, by means of the visual check, double registration of products which are provided with both marking systems.

Two self-service checkouts are preferably combined so that it is possible to arrange a plurality of self-service checkouts in a space-saving manner.

The invention claimed is:

1. A self-service checkout device having a product registration area for registering the products, a display for displaying and inputting information, a card reader for paying for the products and a data processing device, the product registration area having a reading device with a barcode reader and an RFID reader, and the signals from the barcode reader and the signals from the RFID reader being forwarded to the data processing device, wherein a camera is provided for the purpose of registering the products in the region of the product registration area, and an image that is recorded by the camera is supplied to an image processing device that is connected to the data processing device, in which case, if an article is registered twice, both by means of a barcode and by means of an RFID tag, the number of the article registered is obtained from the image recorded.

2. The self-service checkout device as claimed in claim 1 wherein a weighing device is provided.

3. The self-service checkout device as claimed in claim 2 wherein the weighing device is connected to the data processing device, in which case, if an article is registered twice, both by means of a barcode and by means of an RFID tag, the number of the article registered is obtained from the weight determined.

4. The self-service checkout device as claimed in claim 1 wherein the RFID reader is in the form of a read and write device.

5. The self-service checkout device as claimed in claim 1 wherein a cash module is provided for paying with banknotes or coins.

6. The self-service checkout device as claimed in claim 1 wherein a transport device which can be used to transport the products through the scanning region registration area is provided.

7. The self-service checkout device as claimed in claim 6, wherein the RFID reader is arranged underneath the transport device.

* * * * *